(12) United States Patent
Liu et al.

(10) Patent No.: US 11,409,585 B2
(45) Date of Patent: Aug. 9, 2022

(54) AUTOMATIC CODE GENERATION FOR API MASHUPS

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/929,878

(22) Filed: May 27, 2020

(65) Prior Publication Data
US 2021/0373984 A1 Dec. 2, 2021

(51) Int. Cl.
G06F 9/54 (2006.01)
G06F 16/955 (2019.01)
G06F 8/30 (2018.01)

(52) U.S. Cl.
CPC .............. G06F 9/547 (2013.01); G06F 8/30 (2013.01); G06F 16/955 (2019.01)

(58) Field of Classification Search
None
See application file for complete search history.

(56) References Cited

U.S. PATENT DOCUMENTS

| | | | |
|---|---|---|---|
| 9,367,595 B1 * | 6/2016 | Maiks | |
| 2010/0153865 A1 * | 6/2010 | Barnes | |
| 2010/0257242 A1 * | 10/2010 | Morris | |
| 2013/0024875 A1 * | 1/2013 | Wang | |
| 2018/0165135 A1 | 6/2018 | Bahrami et al. | |

OTHER PUBLICATIONS

Gao, W., Chen, L., Wu, J. and Gao, H., Jun. 2015. Manifold-learning based API Recommendation for Mashup Creation. In 2015 IEEE international conference on web services (pp. 432-439). IEEE.

Xue, Q., Liu, L., Chen, W., & Chuah, M. C. (Dec. 2017). Automatic Generation and Recommendation for API Mashups. In 2017 16th IEEE International Conference on Machine Learning and Applications (ICMLA) (pp. 119-124). EEE.

Glassman, E. L., Zhang, T., Hartmann, B., & Kim, M. (Apr. 2018). Visualizing api usage examples at scale. In Proceedings of the 2018 CHI Conference on Human Factors in Computing Systems (pp. 1-12).

"ProgrammableWeb." https://www.programmableweb.com/.

* cited by examiner

*Primary Examiner* — Syed A Roni
(74) *Attorney, Agent, or Firm* — Fujitsu Patent Center

(57) ABSTRACT

According to an aspect of an embodiment, operations include receiving a first input corresponding to a selection of one or more Application Programming Interface (API)-based trigger options associated with one or more electronic trigger events. The operations further include receiving a second input corresponding to a selection of one or more trigger rules which are applicable on event data associated with the one or more electronic trigger events and receiving a third input corresponding to a selection of one or more API-based actions. The operations further include constructing an API mashup template based on the first input, the second input, and the third input and generating an API mashup code based on the constructed API mashup template. The API mashup code is configured to be computer-executable on a runtime system.

20 Claims, 8 Drawing Sheets

AUTOMATIC CODE GENERATION FOR API MASHUPS

FIELD

The embodiments discussed in the present disclosure are related to automatic generation of code for application programming interface (API) mashups.

BACKGROUND

Many companies and organizations offer web APIs for several applications, such as speech processing and social media analysis. With rapid rise in number of APIs, there has been a rise in demand for API mashups. An API mashup typically combines the functionality of several APIs into a new service. API mashups are used in all kinds of businesses and are generally used by companies to integrate various software into their products efficiently and inexpensively.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving a first input corresponding to a selection of one or more Application Programming Interface (API)-based trigger options associated with one or more electronic trigger events. The operations may further include receiving a second input corresponding to a selection of one or more trigger rules which may be applicable on event data associated with the one or more electronic trigger events. The operations may further include receiving a third input corresponding to a selection of one or more API-based actions to be performed based on whether the event data satisfies the one or more trigger rules. The operations may further include constructing an API mashup template based on the received first input, the received second input, and the received third input and generating an API mashup code based on the constructed API mashup template. The generated API mashup code may be configured to be computer-executable on a runtime system.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

all according to at least one embodiment described in the present disclosure.

DESCRIPTION OF EMBODIMENTS

Some embodiments described in the present disclosure relate to a method and a non-transitory computer-readable medium for automatic generation of workflow code for an API mashup. The present disclosure relates to the generation of a workflow code for an API mashup, without a need for a developer to manually code various sections (trigger, rule, action) of the API mashup. Typically, conventional methods rely on a developer to generate workflow codes, which when executed, can listen to event triggers, apply trigger rules on trigger output data, and performs actions based on whether trigger output data satisfies the trigger rules. The developer may need to explicitly code the event triggers, trigger rules, and actions and then may have to test individual section of the generated workflow code for debugging errors. This strategy often takes a longer development life cycle usually with a higher development cost in terms of resources. Although there are several companies which provide API mashup platforms, the mashup recipes included in these platforms are still few. It takes time to add more mashup recipes in these platforms because it requires human programming efforts from the experienced API software developers.

According to one or more embodiments of the present disclosure, the technological field of software development may be improved by configuring a system to generate a workflow code for an API mashup, without a need for a developer to manually code individual sections of the API mashup. The executable codes, including triggers, rules and actions, may be generated to achieve end-to-end API mashups. Compared with existing platforms that rely on experienced human developers to design codes for each new API triggers and actions, the mashup recipes of the present disclosure are generated by a machine (with limited human-in-the-loop), which allows for achievement of a shorter development cycle (developer time may be consumed mostly during testing/validation) and lower development cost to include new APIs. The present disclosure may also incur low development cost during the generation of workflow code for API mashup and also for the future integrations of API's in the API mashup. Therefore, the present disclosure may save developer efforts and time that was previously required in generation of workflow code.

Embodiments of the present disclosure are explained with reference to the accompanying drawings.

Figure 1:
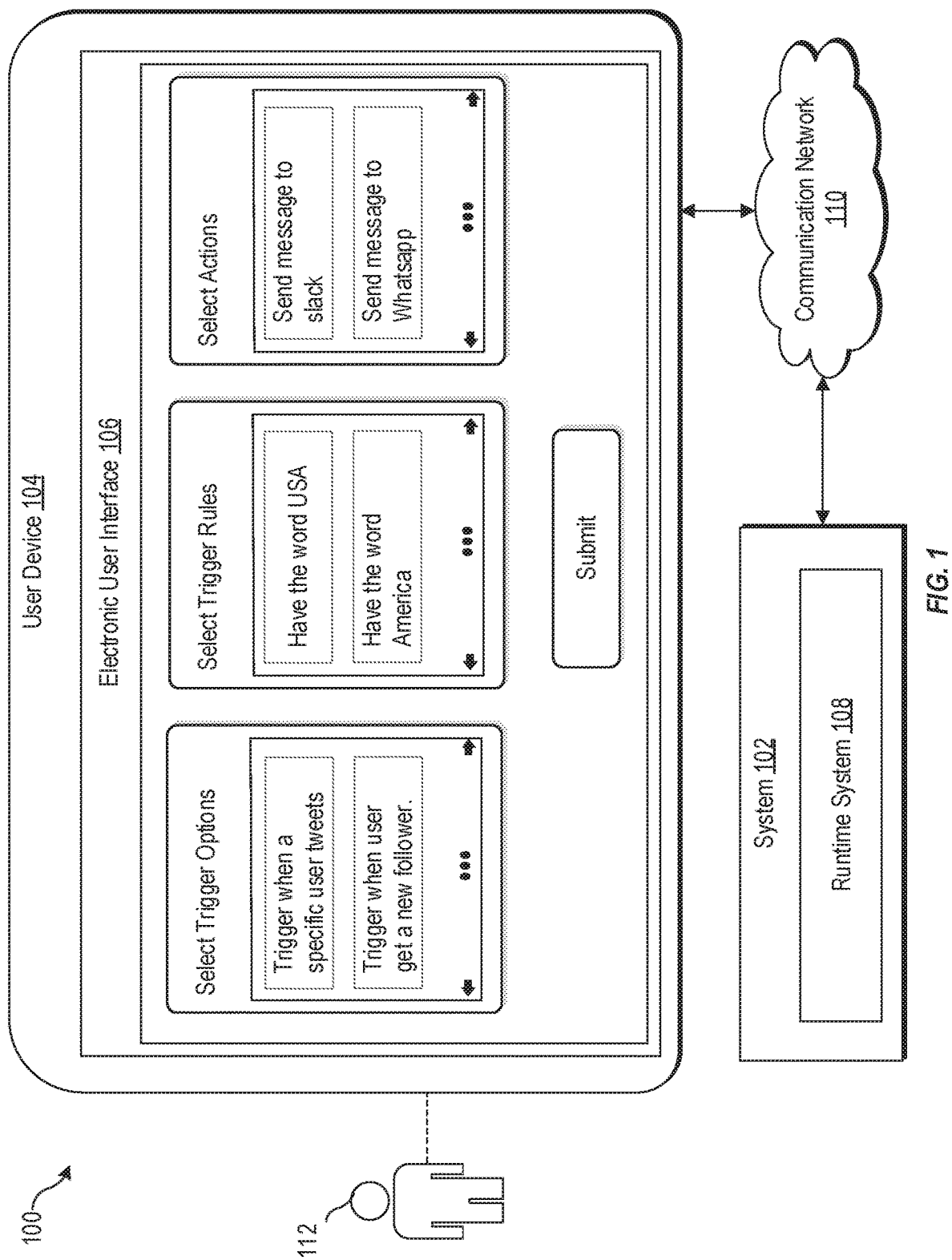
FIG. 1 is a diagram representing an example environment related to automatic code generation for API mashups.

FIG. 1 is a diagram representing an example environment related to automatic code generation for API mashups, arranged in accordance with at least one embodiment described in the present disclosure. With reference to FIG. 1, there is shown an example environment 100. In the example environment 100, there is shown a system 102 and a user device 104. There is further shown an electronic user interface (UI) 106 rendered onto a display screen of the user device 104. With reference to FIG. 1, there is further shown a runtime system 108 and a communication network 110. The system 102 and the user device 104 may be communicatively coupled to each other, via the communication network 110.

There is further shown a user 112 who may be associated with the user device 104. Examples of the user device 104 may include, but are not limited to, a mobile device, a desktop computer, a laptop, a computer workstation, a server, such as a cloud server, or a group of servers. In one or more embodiments, the user device 104 may include a user-end terminal device and a server communicatively coupled to the user-end terminal device. Examples of the user-end terminal device may include, but are not limited to, a mobile device, a desktop computer, a laptop, or a computer workstation.

The system 102 may include suitable logic, circuitry, and interfaces that may be configured to display a set of user-selectable options corresponding to one or more application programming interface (API)-based trigger options, trigger rules, and API-based actions onto the electronic UI 106 of the user device 104. The system 102 may receive a first input corresponding to a selection of one or more API-based trigger options. These trigger options may be associated with one or more electronic trigger events. For example, a trigger option 'Tweet from the specific user' on the electronic UI 106 may specify an electronic trigger event as a detection of a new tweet from a specific user. Each electronic trigger event may be associated with event data, which may be used to detect the electronic trigger event. With reference to the previous example, the event data may include the tweet message along with metadata (such as tweet time, date, message ID, URL) as posted on a twitter page and accessible on an event source (Twitter® web server) or an API resource server.

The system 102 may further receive a second input. The second input may be received from the user 112 via the electronic UI 106 of the user device 104 and may correspond to a selection of one or more trigger rules, which may be applicable on the event data. Each trigger rule may include, for example, a rule parameter, a rule pattern, and a rule operator. The rule parameter may be full or a part of the event data. The rule pattern may be matched in the event data based on the rule operator defined in the trigger rule. For example, a rule parameter may be "Tweet text", a first trigger rule on a tweet may include a rule pattern as "USA" or "America" and the rule operator as "contains". The first trigger rule may be applied on the tweet (i.e. as part of the event data) to determine whether the tweet from the specific user contains the word "USA" or the word "America".

In an embodiment, the second input may correspond to a selection of a single trigger rule for the event data. In another embodiment, the second input may correspond to a selection of multiple trigger rules for the event data. In case of multiple trigger rules, a logical operator may also be included in the second input to combine the multiple trigger rules. Referring to the above-mentioned example, if the user 112 adds a second trigger rule on the tweet to include a rule pattern as "Japan" and a rule operator as "Ncontains", then the user 112 may have to specify a logical operator (such as an "OR" or an "AND") to combine the first trigger rule with the second trigger rule. The second trigger rule may be applied on the tweet (i.e. as part of the event data) after the first trigger rule is applied to determine whether the tweet from the specific user doesn't contains the word "Japan". In this case, if the logical operator is "AND", then a trigger response may be generated as true (1) when the results of both the first trigger rule and the result of the second trigger rule on the tweet are true.

The system 102 may receive a third input from the user 112 via the electronic UI 106 of the user device 104. The third input may correspond to a selection of one or more API-based actions. These actions may be performed based on whether the event data satisfies the trigger rule(s). For example, if the tweet from the specific user has the word 'USA' or 'America', an action may be performed to send a message including the tweet on a particular messaging application. These actions may not be performed if the event data doesn't satisfy the trigger rule(s).

The system 102 may construct an API mashup template based on the received first input, the received second input, and the received third input. The API mashup template may contain data structured in the form of key-value pairs and may be generated in structured data formats, such as, but not limited to, JavaScript Object Notation (JSON), Yet Another Markup Language (YAML), or Extensible Markup Language (XML) format. The data in the constructed API mashup template may include, for example, a unique mashup identifier, one or more computer-executable trigger codes associated with the trigger options, a first set of input parameters for the one or more computer-executable trigger codes, the trigger rule(s), each of which may include a rule operator and a rule pattern for the event data, one or more computer-executable action codes associated with the actions, a second set of input parameters for the one or more computer-executable action codes, and the like.

The system 102 may generate an API mashup code based on the constructed API mashup template. The API mashup code may be configured to be computer executable on the runtime system 108, which may refer to collection of managed hardware and software resources which are typically required for program execution. The API mashup code may include the one or more computer-executable trigger codes associated with the trigger options, the one or more computer-executable rule codes associated with the trigger rules, and the one or more computer-executable action codes associated with the API-based actions. Further details on the generation of the API mashup code and the execution on the runtime system 108 are provided, for example, in FIG. 6 and FIG. 7.

It should be noted that the communication between the system 102 and the user device 104 may be performed via the communication network 110. The communication network 110 may include a communication medium through which the system 102 may communicate with the user device 104 and/or different devices (not shown). Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, the system 102 may be a distributed network of servers which may collectively operate to generate API mashup code for an API mashup.

Figure 2:
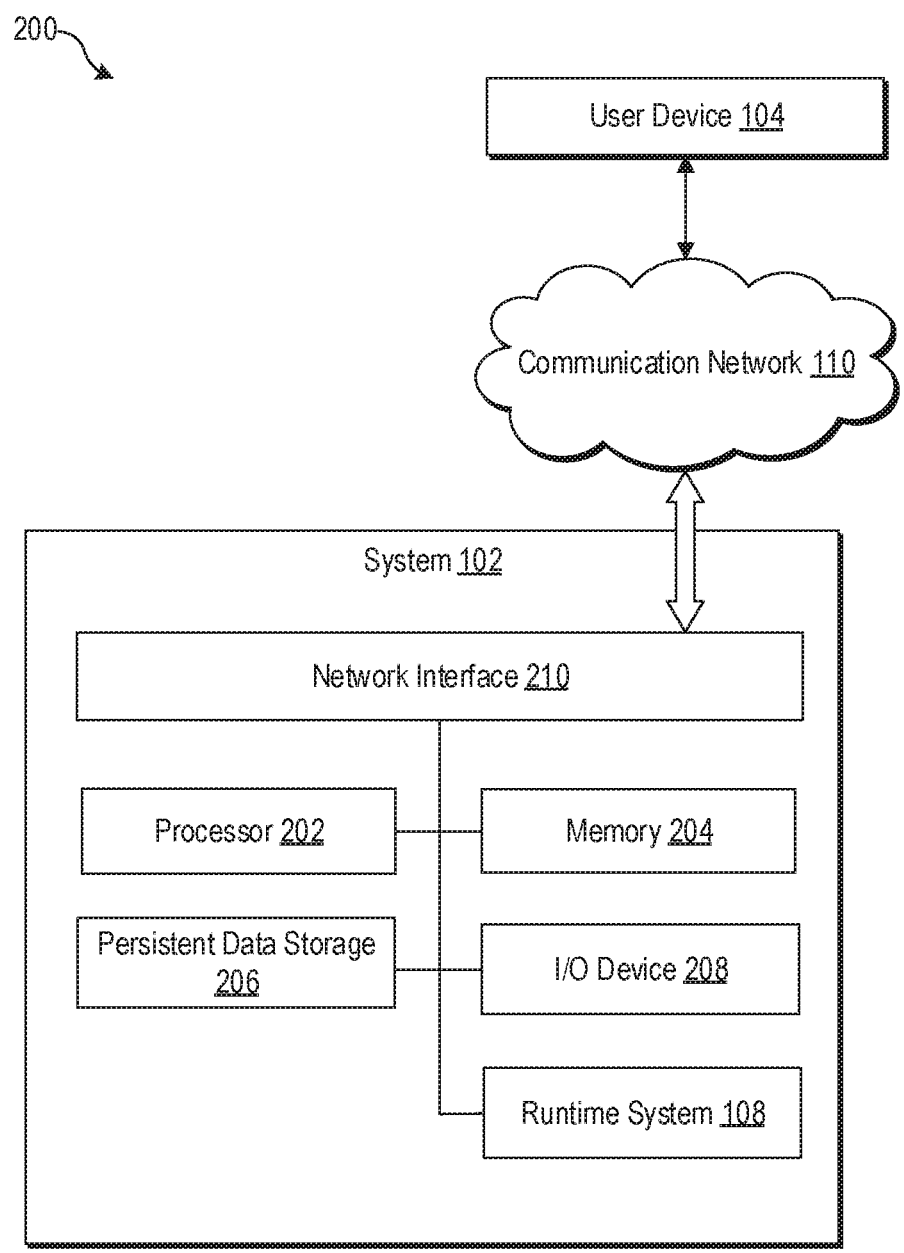
FIG. 2 is a block diagram of a system for automatic code generation for API mashups.

FIG. 2 is a block diagram of a system for automatic code generation for API mashups, arranged in accordance with at least one embodiment described in the present disclosure. FIG. 2 is explained in conjunction with elements from FIG. 1. With reference to FIG. 2, there is shown a block diagram 200 of the system 102 of FIG. 1. The system 102 may include a processor 202, a memory 204, a persistent data storage 206, an input/output (I/O) device 208, a network interface 210, and the runtime system 108. There is further shown the user device 104 communicatively coupled to the system 102, via the communication network 110.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store information associated with one or more API-based trigger options, one or more trigger rules, and one or more API-based actions. In certain embodiments, the memory 204 may be configured to store different types of rule operators that may be included in the trigger rules. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive a user input. The I/O device 208 may be further configured to provide an output in response to the user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The network interface 210 may include suitable logic, circuitry, interfaces, and/or code that may be configured to establish a communication among the system 102 and the user device 104, via the communication network 110. The network interface 210 may be implemented by use of various known technologies to support wired or wireless communication of the system 102, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

In certain embodiments, the system 102 may be divided into a front-end subsystem and a backend subsystem. The front-end subsystem may be solely configured to receive requests/instructions from the user device 104, one or more of third-party servers, web servers, client machine, and the backend subsystem. These requests may be communicated back to the backend subsystem, which may be configured to act upon these requests. For example, in case the system 102 includes multiple servers, few of the servers may be front-end servers configured to relay the requests/instructions to remaining servers associated with the backend subsystem.

The functions or operations executed by the system 102, as described in FIG. 1, may be performed by the processor 202. Operations executed by the processor 202 are described in detail, for example, in FIG. 3A, FIG. 3B, FIG. 4, FIG. 5, FIG. 6, and FIG. 7.

Modifications, additions, or omissions may be made to the system 102 without departing from the scope of the present disclosure. For example, in some embodiments, the system 102 may include any number of other components that may not be explicitly illustrated or described.

Figure 3A:
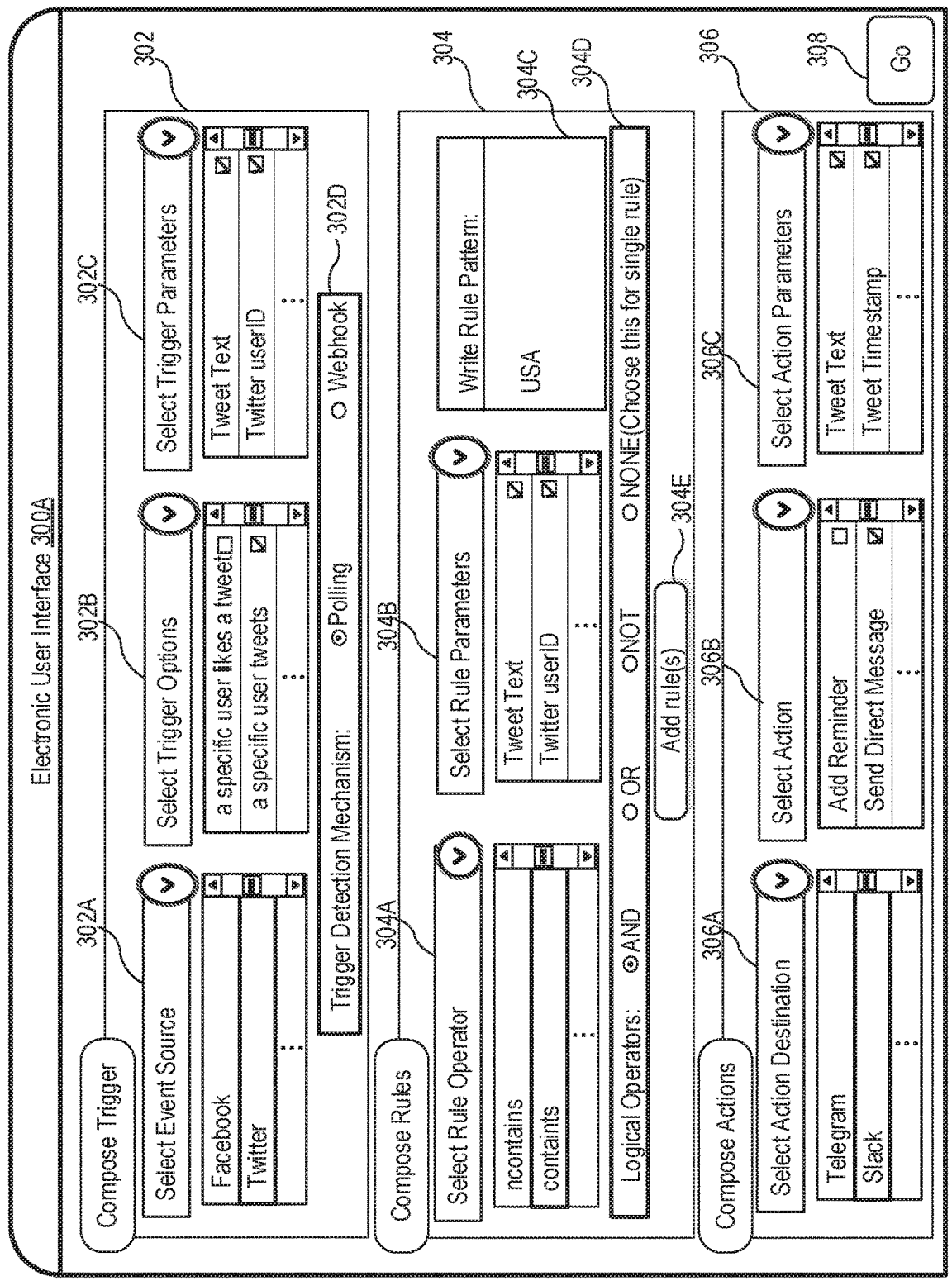
FIG. 3A is a diagram that illustrates an example electronic user interface for providing input(s) for automatic code generation for an API mashup.

FIG. 3A is a diagram that illustrates an example electronic user interface for providing input(s) for automatic code generation for an API mashup, according to at least one embodiment described in the present disclosure. FIG. 3A is explained in conjunction with elements from FIG. 1 and FIG. 2. With reference to FIG. 3A, there is shown an electronic UI 300A, which is an example implementation of the electronic UI 106 of FIG. 1. The electronic UI 300A may be displayed on the user device 104 based on a user request, which may be received via an application interface displayed onto a display screen of the user device 104. The application interface may be part of an application software, for example, a software development kit (SDK), a cloud server-based application, a web-based application, an OS-based application/application suite, an enterprise application, a mobile application for API mashup generation.

On the electronic UI 300A, there is shown a set of UI elements, such as a first UI element 302, a second UI element 304, a third UI element 306, and a fourth UI element 308. In FIG. 3A, the first UI element 302 is labelled as, for example, "Compose Triggers". The first UI element 302 may include an event source menu 302A, a trigger options menu 302B, a trigger parameter menu 302C, and a trigger detection mechanism menu 302D. Through the event source menu 302A, the trigger options menu 302B, the trigger parameter menu 302C, and the trigger detection mechanism menu 302D, a plurality of API-based trigger options may be displayed for the user 112. The system 102 may receive a first input corresponding to a selection of one or more API-based trigger options associated with one or more electronic trigger events from among the plurality of API-based trigger options.

The event source menu 302A may be a drop-down menu, which may list a set of event sources (such as API providers) from which the event data associated with the electronic trigger events may be received. Similarly, the trigger options menu 302B may be a drop-down menu that may display multiple trigger options, each of which may be associated with one or more electronic trigger events. The trigger options menu 302B may allow the user 112 to select one or more trigger options, for example, via checkboxes. In one or more embodiments, the drop-down list of the trigger options menu 302B may be populated with trigger options associated with the selected event source, after the selection of the event source via the event source menu 302A. For example, if the event source is Twitter®, the drop-down list of the trigger options menu 302B may be populated with trigger options (i.e. natural language descriptors for API endpoints) associated with Twitter®.

In one or more embodiments, instead of providing the event source menu 302A, all the event sources in the event source menu 302A may be combined with the trigger options in the trigger options menu 302B to offer a single list of trigger options. In such an implementation, the text description of a trigger option may be concatenated with the event source. For example, if the event is "Twitter®", and the action is "Detect a new follower", the text description may be provided as "Detect a new follower on Twitter®".

Similarly, the trigger parameter menu 302C may be a drop-down menu that may display multiple trigger parameters associated with the selected one or more API-based trigger options. The trigger parameter menu 302C may allow the user 112 to select multiple trigger parameters, for example, via checkboxes displayed next to such trigger parameters. The dropdown list of the trigger parameter menu 302C may be populated after the selection of the event source via the event source menu 302A and the trigger options via the trigger options menu 302B. In an embodiment, the trigger parameters (i.e. endpoint parameters for API endpoints) for the trigger parameter menu 302C may be retrieved from the event source for the selected trigger options. In another embodiment, the trigger parameters may be extracted from API specifications (e.g., Open API Specifications) for API endpoint(s) associated with the selected trigger options.

The trigger detection mechanism menu 302D may be a radio button menu. The user 112 may be provided with option to select a first trigger detection mechanism from a set of trigger detection mechanisms, which may include a polling-based event detection mechanism and a webhook-based event detection mechanism. The system 102 may receive a fourth input corresponding to the selection of the first event detection mechanism as one of the polling-based event detection mechanism or the webhook-based event detection mechanism. Details about the implementation of trigger detection mechanisms are provided, for example, in FIG. 6 and FIG. 7.

In some embodiments, the selection of the trigger detection mechanism may be based on the selection of the event source via the event source menu 302A. For instance, some event sources (such as API resource servers) may not support Webhook-based event detection mechanism. For such event sources, the radio button for the selection of the webhook-based event detection mechanism may be disabled by default and the polling-based event detection mechanism may be selected by default. Some other event sources may support both types of trigger detection mechanisms. For such event sources, the user 112 may be provided with an option to select any trigger detection mechanism from among the set of event detection mechanisms.

By way of example, and not limitation, if the event source is selected as Twitter®, the trigger options menu 302B may be populated with multiple trigger options, such as, but not limited to, a specific user likes a tweet, a specific user posts a new tweet, a particular hash-tag is a trending, a tweet posted from a specific geo location, or a specific user gets a new follower. The user 112 may select an API-based trigger option as 'a specific user posts a new tweet'. For the selected option, the trigger parameters may include, for example, a user ID to identify the specific user, a time or period in which new tweets may be detected, and the like. The trigger parameter(s) may be used as input parameters for API calls to the API resource server (i.e. the event source) to extract an API response, which may include the new tweet from the specific user and metadata, such as message ID, tweet time, tweet ID, or tweet tags. Information in the API response may be considered as the event data, which may be later on used to check whether trigger rules are satisfied, as described herein.

The second UI element 304 may be labelled as, for example, "Compose Rules" and may include a rule operator menu 304A, a rule parameter menu 304B, a rule pattern textbox 304C, a logical operator menu 304D, and an add rule(s) button 304E. Through the rule operator menu 304A, the rule parameter menu 304B, the rule pattern textbox 304C, and/or the logical operator menu 304D, and/or the add rule(s) button 304E, a plurality of configurable trigger rules for the API mashup may be displayed to the user 112. The system 102 may receive a second input corresponding to a selection of one or more trigger rules from among the plurality of configurable trigger rules. The one or more trigger rules may be applicable on event data associated with the one or more electronic trigger events.

The rule operator menu 304A may be a drop-down menu, which may list a set of pre-defined rule operators that may be applicable on the event data associated with the one or more electronic trigger events. Examples of such rule operators with their corresponding descriptions are presented in Table 1, as follows:

TABLE 1

Different rule operators with description

| IF Rule Operator | Description |
| --- | --- |
| Equals | If trigger value equals the provided value. |
| Nequals | If trigger value does not equal the provided value. |
| Iequals | If string trigger value equals the provided value case insensitively. |
| Lessthan | If trigger value is less than the provided value. |
| Greaterthan | If trigger value is greater than the provided value. |
| NLessthan | If trigger value is not less than (equals or more than) the provided value. |
| NGreaterthan | If trigger value is not greater than (equals or less than) the provided value. |
| Matchwildcard | If trigger value matches the provided wildcard-like string. This operator provides support for Unix shell-style wildcards such as * and ?. |
| Regex | If trigger value matches the provided regular expression pattern. |

TABLE 1-continued

Different rule operators with description

| IF Rule Operator | Description |
| --- | --- |
| Iregex | If trigger value matches the provided regular expression pattern case insensitively. |
| Contains | If trigger value contains the provided value. |
| Ncontains | If trigger value does not contain the provided value. |
| Icontains | If string trigger value contains the provided value case insensitively. |
| Incontains | If string trigger value does not contain the provided string value case insensitively. |
| Startswith | If beginning of the string trigger value matches the provided string value. |
| Istartswith | If beginning of the string trigger value matches the provided string value case insensitively. |
| Endswith | If end of the string trigger value matches the provided string value. |
| Iendswith | If end of the string trigger value matches the provided string value case insensitively. |
| timediff_lt | If time difference between trigger value and current time is less than the provided value. |
| timediff_gt | If time difference between trigger value and current time is greater than the provided value. |
| timediff_nlt | If time difference between trigger value and current time is not less than the provided value. |
| timediff_ngt | If time difference between trigger value and current time is not greater than the provided value. |
| Exists | If key exists in payload. |
| Nexists | If key doesn't exist in payload. |
| Inside | If trigger payload is inside provided value. Reverse of contains. |
| Ninside | If trigger payload is not inside provided value. Reverse of ncontains |

The rule parameter menu 304B may be a drop-down menu that may display multiple rule parameters. The rule parameter menu 304B may allow the user 112 to select a rule parameter that may act as a first operand for the selected rule operator via the rule operator menu 304A. The dropdown list of the rule parameter menu 304B may be populated after the selection of the trigger parameters via the trigger parameter menu 302C.

The pattern textbox 30CB may allow the user 112 to add a rule pattern. The rule pattern may be act as a second operand for the selected rule operator. The system 102 may determine if the event data associated with the selected rule parameter satisfies conditions imposed by combination of the rule operator and the rule pattern.

In some embodiments, the user 112 may be provided with options to select a logical operator from the logical operator menu 304D (as represented by radio buttons). The user 112 may select the logic operator when the user 112 wants to include more than one trigger rule. The logical operator may be for example, a logical AND, a logical OR, and the like, and may correspond to a logical operation between results of two separate trigger rules.

The user 112 may be further provided with options to add another trigger rule by clicking on the add rule(s) button 304E. Upon selection of the add rule(s) button 304E, the system 102 may display a new UI element, which may be similar to the second UI element 304. The user 112 may be again provided with options to select a rule operator, rule parameters, and a rule pattern to configure another trigger rule.

By way of example, and not limitation, the rule operator, the rule parameter, and the rule pattern for a trigger rule may be selected as 'contains', 'tweet', and 'USA', respectively, to setup a trigger rule to look up tweets (as event data) which contains the term "USA". If the trigger rule evaluates to be true, the system 102 may generate a trigger response (e.g., 1 or true) and based on the trigger response, perform one or more API-based actions specified through the third UI element 306, as described herein. If the trigger rule evaluates to be false, the system 102 may not perform any action(s) and may wait for a new electronic trigger event (i.e. a new tweet) to occur and then again check whether the new tweet satisfies the trigger rule. Above process may be repeated until the trigger rule evaluates to be true.

The third UI element 306 may be labelled as, for example, "Compose Actions". The third UI element 306 may include an action destination menu 306A, an action menu 306B, and an action parameter menu 306C. Through the action destination menu 306A, the action menu 306B, the action parameter menu 306C, a plurality of API-based actions for the API mashup may be displayed to the user 112. The system 102 may receive a third input corresponding to a selection of one or more API-based actions to be performed based on whether the event data satisfies the one or more trigger rules (selected via the second UI element 304). The one or more API-based actions may be selected from among the plurality of API-based actions, as displayed in the third UI element 306.

The action destination menu 306A may be a drop-down menu, which may list a set of action destinations through which an API-based action may be performed if the event data satisfies the one or more trigger rules. For example, the set of action destinations may contain a list of API providers, each of which may provide one or more API endpoints as API-based action(s). The user 112 may be provided with options to select one or more actions destinations from among the set of action destinations.

The action menu 306B may be a drop-down menu which may list multiple actions associated with a selected action destination as user-selectable options. Each action in the action menu 306B may correspond to an API endpoint of an API provider (selected as an action destination via the action destination menu 306A). In one or more embodiments, instead of providing the action destination menu 306A, all the action destinations in the action destination menu 306A may be combined with the actions in the action menu 306B to offer a single list of actions. In such an implementation, the text description of an action in the action menu 306B may be concatenated with an action destination (or the API provider name). For example, if the action destination is "Slack®", and the action is "send a message", the text description may be provided as "Send a message on Slack".

The action parameter menu 306C may be a drop-down menu that may display multiple action parameters as user-selectable inputs for the selected action(s) via the action menu 306B. Each action parameter in the action parameter menu 306C may correspond to an endpoint parameter for an API endpoint (i.e. a selected action through the action menu 306B) and may be displayed to the user 112 upon the selection of the action.

By way of example, and not limitation, if the action destination is selected as Slack®, the actions menu 306B may be populated with actions such as, but not limited to, Add Reminder, Send Direct Message, Create Channel, Set Channel Topic, Set Status, Send Channel Message, or Send Private Channel Message. The user 112 may select an action as 'Send Direct message' and may choose action parameters as 'tweet text' and 'tweet timestamp'. The API-based action may be composed as "send a message on Slack® with the message including the tweet of the specific user and the timestamp of the tweet".

The fourth UI element 308 may be labelled as, for example, "Go" and may be button. Upon a selection of the button, the system 102 may construct an API mashup template based on the first user input via the first UI element 302, the second user input via the second UI element 304, and the third user input, via the third UI element 306.

It should be noted that the electronic UI 300A is merely provided as an exemplary example to illustrate a selection of an API-based trigger option, one or more trigger rules, and an API-based action and should not be construed as limiting for the present disclosure. In some embodiments, the electronic UI 300A may be suitably modified to allow the user 112 to select multiple API-based trigger options and/or multiple API-based actions. For instance, through the electronic UI 300A, multiple API-based trigger options may be selected to trigger one single API-based action or one API-based trigger option to trigger multiple API-based actions.

It should be further noted that the trigger rules in the electronic UI 300A are merely provided as an example and should not be construed as limiting for the present disclosure. In some embodiments, the electronic UI 300A may be suitably modified to allow the user 112 to compose more complex trigger rules, such as nested rules (for e.g., if first rule is satisfied, then check if second rule is satisfied, and then trigger an action) or combining multiple trigger rules through a suitable logical operator (for e.g., if both the first rule "AND" the second rule are satisfied, then trigger an action).

Figure 3B:
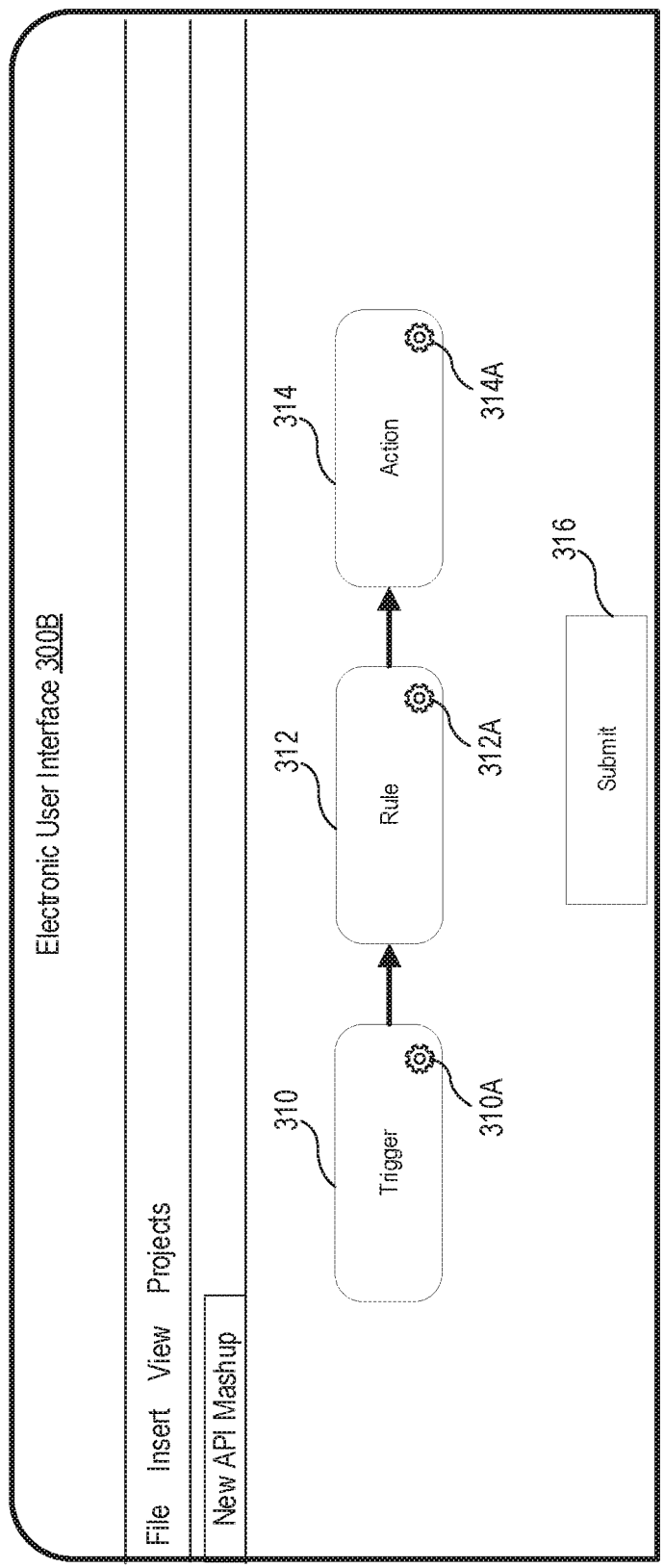
FIG. 3B is a diagram that illustrates an example electronic user interface for setting up an API mashup based on inputs received via the example electronic user interface of FIG. 3A.

FIG. 3B is a diagram that illustrates an example electronic user interface for setting up an API mashup based on inputs received via the example electronic user interface of FIG. 3A, according to at least one embodiment described in the present disclosure. FIG. 3B is explained in conjunction with elements from FIG. 1, FIG. 2, and FIG. 3A. With reference to FIG. 3B, there is shown an electronic UI 300B, which may be an exemplary implementation of the electronic UI 106 of FIG. 1.

The electronic UI 300B may be displayed on the user device 104 based on a user request, which may be received via an application interface displayed onto a display screen of the user device 104. The application interface may be part of an application software, for example, a software development kit (SDK), a cloud server-based application, a web-based application, an OS-based application/application suite, an enterprise application, a mobile application. For example, the electronic UI 300B may be displayed after the user 112 selects the fourth UI element 308 to submit all the inputs (such as the first input via the first UI element 302, the second input via the second UI element 304, and the third input via the third UI element 306).

On the electronic UI 300B, there is shown a set of UI elements, such as a UI element 310, a UI element 312, a UI element 314, and an UI element 316. The UI element 310 may represent an API-based trigger for the API mashup. The UI element 310 may be linked to computer-executable codes for API calls to one or more API endpoints for detection of one or more electronic trigger events and extraction of event data associated with the detected one or more electronic trigger events. The user 112 may configure the API-based trigger for the API mashup by selecting a setting UI element 310A, which may be linked to the first UI element 302 of FIG. 3A.

The UI element 312 may represent the trigger rules for the API mashup and may be linked to computer-executable codes for the application of the trigger rules on the event data associated with the one or more electronic trigger events. The user 112 may configure the trigger rules for the API mashup by selecting a setting UI element 312A, which may be linked to the second UI element 304 of FIG. 3A. Similarly, the UI element 314 may represent the API-based actions for the API mashup to be performed based on whether the event data satisfies the trigger rules. The user 112 may configure the API-based actions for the API mashup by selecting a setting UI element 314A, which may be linked to the third UI element 306 of FIG. 3A.

The electronic UI 300B may be rendered to allow the user 112 to follow a drag and drop approach to setup the API mashup. For the drag and drop approach, each UI element may be rendered as a graphical block with nodes for input/output (I/O). Two graphical blocks may be connected with each other through a directional arrow, which may initiate from the node of a first block and terminate at the node of a second block. The direction associated with the directional arrow may depict that output of the first block may be provided as input to the second block.

The UI element 316 may be labelled as, for example, "Submit". Upon selection of the UI element 316, the system 102 may generate an API mashup code based on inputs/data associated with the set of UI elements on the electronic UI 300B. The API mashup code may be configured to be computer-executable on the runtime system 108 and may include computer-executable codes for the one or more API-based triggers, the trigger rules, and the one or more API-based actions.

It should be noted that the electronic UI 300B may provide the ability to add multiple trigger events, multiple rules on at least one of the multiple trigger events, and multiple actions by dragging and dropping more blocks on the electronic UI 300B. The user 112 may be provided with options to add multiple blocks and connect arrows between the multiple blocks based on the requirement of the user 112. This approach may enable user 112 to generated API mashup codes for a composite API mashup that may include more than one API-based trigger options from multiple event sources, more than one trigger rules, or more than one API-based actions.

It should also be noted that the electronic UI 300B is merely provided as an example to illustrate the drag and drop approach for building an API mashup. The electronic UI 300B may also be configured to follow any other approach, such as a step-by-step guidance approach, where the user 112 may be able to sequentially navigate through pages (i.e. a UI) comprising a trigger setup page (corresponding to the first UI element 302), a trigger rule page (corresponding to the second UI element 304), and an action setup page (corresponding to the third UI element 306), without departing from the scope of the present disclosure.

Figure 4:
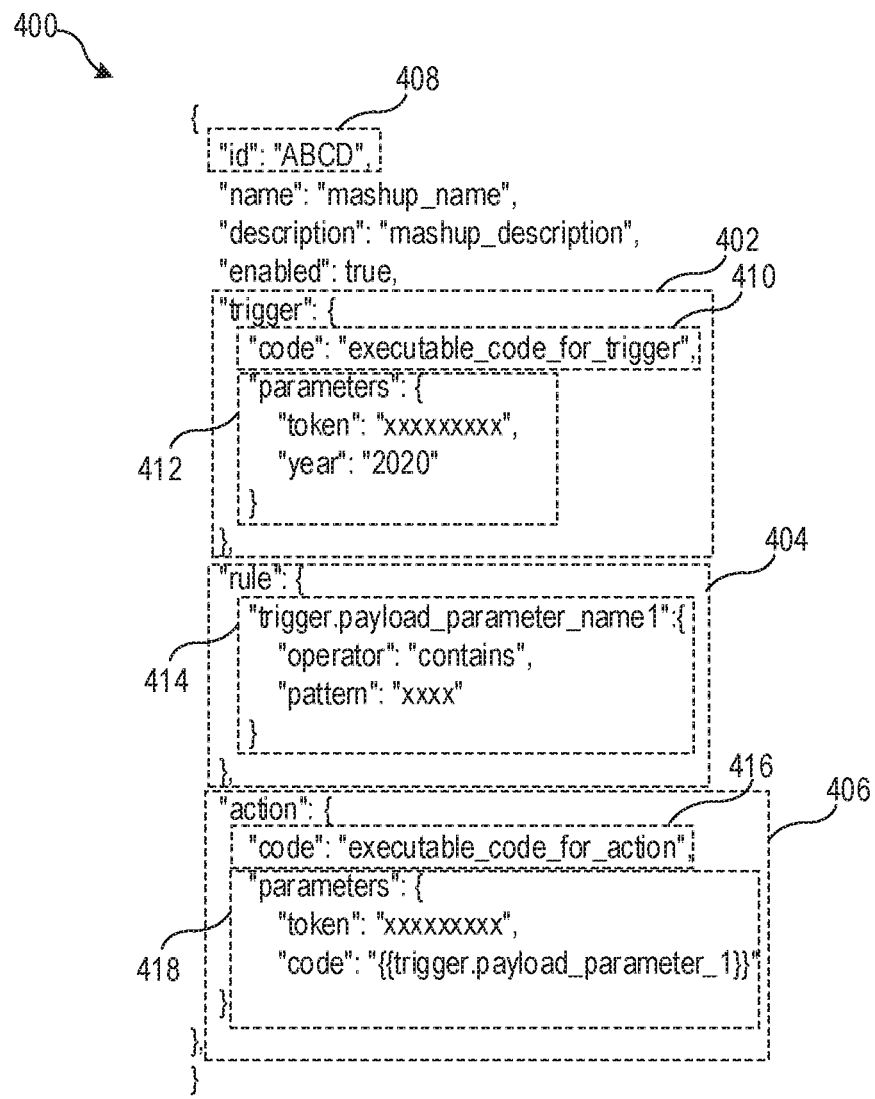
FIG. 4 illustrates an example API mashup template.

FIG. 4 illustrates an example API mashup template, according to at least one embodiment described in the present disclosure. FIG. 4 is explained in conjunction with elements from FIG. 1, FIG. 2, FIG. 3A, and FIG. 3B. With reference to FIG. 4, there is shown an API mashup template 400, which may be constructed based on the received first input, the received second input, and the received third input.

The system 102 may construct the API mashup template 400 based on an IFTTT (If this then that) approach. With the IFTTT approach, the API mashup template 400 may include a trigger section 402, a rule section 404, and an action section 406.

TABLE 2

Description of common keys in the API mashup template 400

Name: the name of the mashup
Description: the description of the mashup
Enabled: the enabled state of a rule (true or false)
Code: reference to the executable code for trigger
Parameters: input parameters associated with that trigger
Rule: including
An attribute of the trigger payload
The type of criteria comparison
The pattern to match against
Action: execution when a rule is matched
Code: reference to the executable code for trigger
Parameters: a set of parameters to pass to the action execution The API mashup template 400 may contain data in a structured format, such as JSON or XML. As an example, the API mashup template 400 is shown in JSON format with key-value pairs. The API mashup template 400 may include a unique API mashup identifier 408, a name of the API mashup, and a description of the API mashup. The API mashup template 400 may further include a computer-executable trigger code associated with an API-based trigger option. The computer-executable trigger code may be included as a value for a code 410 (i.e. a key). The API mashup template 400 may also include a first input parameter for the computer-executable trigger code. The first input parameter may be included as a value for a key, named as parameters 412.

The API mashup template 400 may further include a trigger rule. The trigger rule may include a rule operator (as shown, for example, in Table 1) and a rule pattern for the event data. The trigger rule may correspond to the value for a key "rule" 414. The API mashup template 400 may further include a computer-executable action code associated with an API-based action. The computer-executable action code associated with an API-based action may correspond to the value for a key "code" 416. Further, the API mashup template 400 may include a second input parameter for the computer-executable action code. The second input parameter may be the value corresponding to a key 418.

It should be noted that the API mashup template 400 in JSON format is merely depicted as an example. The API mashup template 400 may be in any suitable format, such as, but not limited to, XML or YAML. The description of the API mashup template 400 in other formats has been omitted for the sake of brevity.

Figure 5:
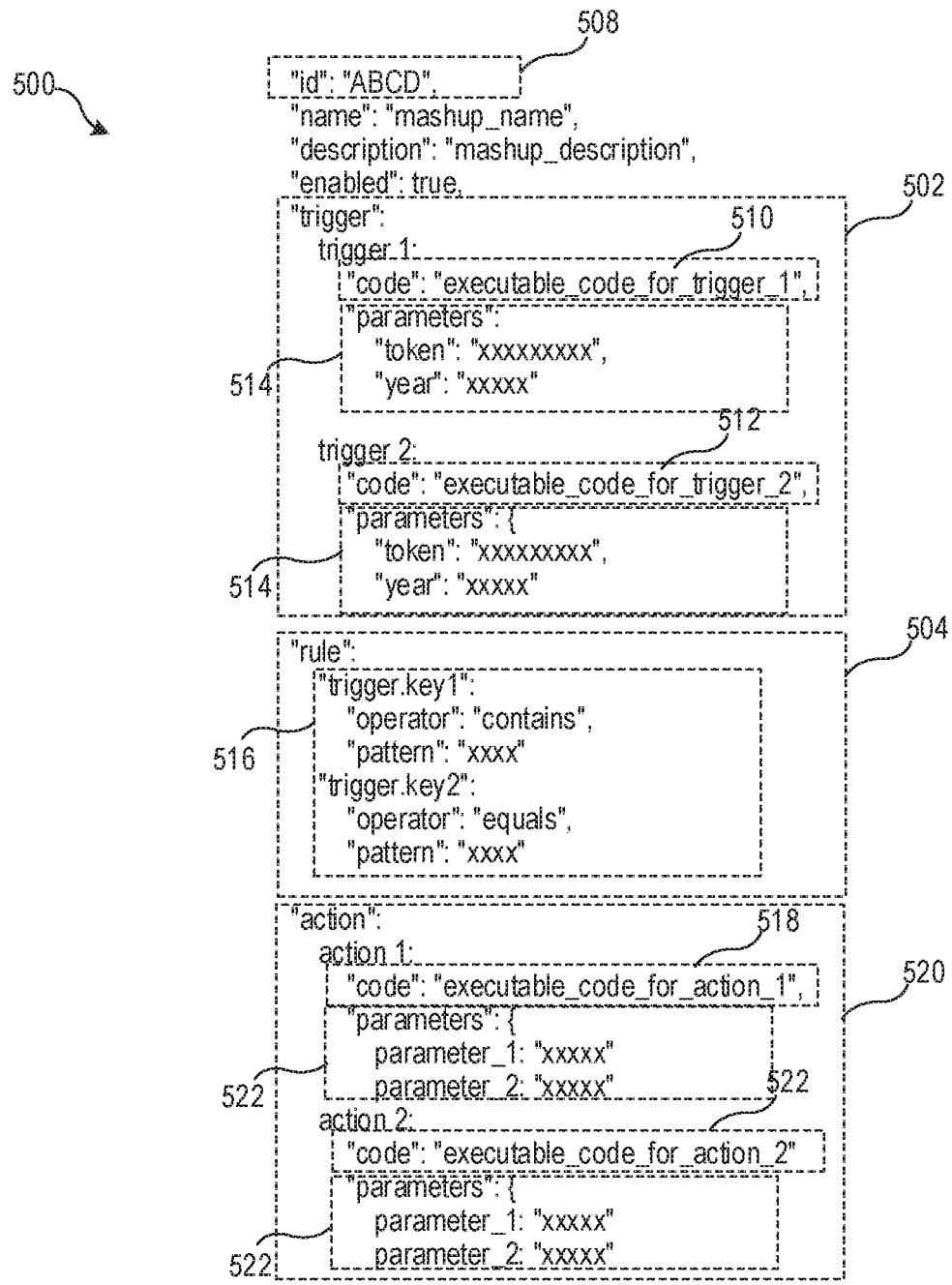
FIG. 5 illustrates an example API mashup template.

FIG. 5 illustrates an example API mashup template, according to at least one embodiment described in the present disclosure. FIG. 5 is explained in conjunction with elements from FIG. 1, FIG. 2, FIG. 3A, FIG. 3B, and FIG. 4. With reference to FIG. 5, there is shown an API mashup template 500, which may be constructed based on the received first input, the received second input, and the received third input.

The system 102 may construct the API mashup template 500 based on an IFTTT (If this then that) approach. With the IFTTT approach, the API mashup template 500 may include a trigger section 502, a rule section 504, and an action section 506. While the API mashup template 400 includes one API-based trigger option and one API-based action, the API mashup template 500 may include more than one API-based trigger options and more than one API-based actions, as described herein.

The API mashup template 500 may contain data in a structured format. As an example, the API mashup template 500 is shown in JSON format with key value pairs. However, the API mashup template 500 may be in any other format such as, but not limited to, XML or YAML. The data in the API mashup template 500 may include a unique API mashup identifier 508, the name of API mashup, and the description of the API mashup. In some embodiments, the name of API mashup may be the unique identifier of the API mashup. The API mashup template 500 may further include two computer-executable trigger codes associated with two API-based trigger options. The two computer-executable trigger codes for the two API-based trigger options may correspond to the values for a key 510 and a key 512. The API mashup template 500 may further include a first set of input parameters for the two computer-executable trigger codes. The first set of input parameters may correspond to the value for a key 'parameters' 514.

The API mashup template 500 may further include two trigger rules. The logical behavior/operator between the two trigger rules in the API mashup template 500 is 'AND'. Each of the two trigger rules may further include a rule operator and a rule pattern for the event data. The two trigger rules may correspond to the value for a key "rule" 516. The API mashup template 500 may further include two computer-executable action code associated with two API-based actions. The two computer-executable action codes associated with the two API-based actions may correspond to the value for a key 518 and a key 520, respectively. Further, the API mashup template 500 may include a second set of input parameters for the one or more computer-executable action codes. The second set of input parameters may correspond to value for a key 522.

Figure 6:
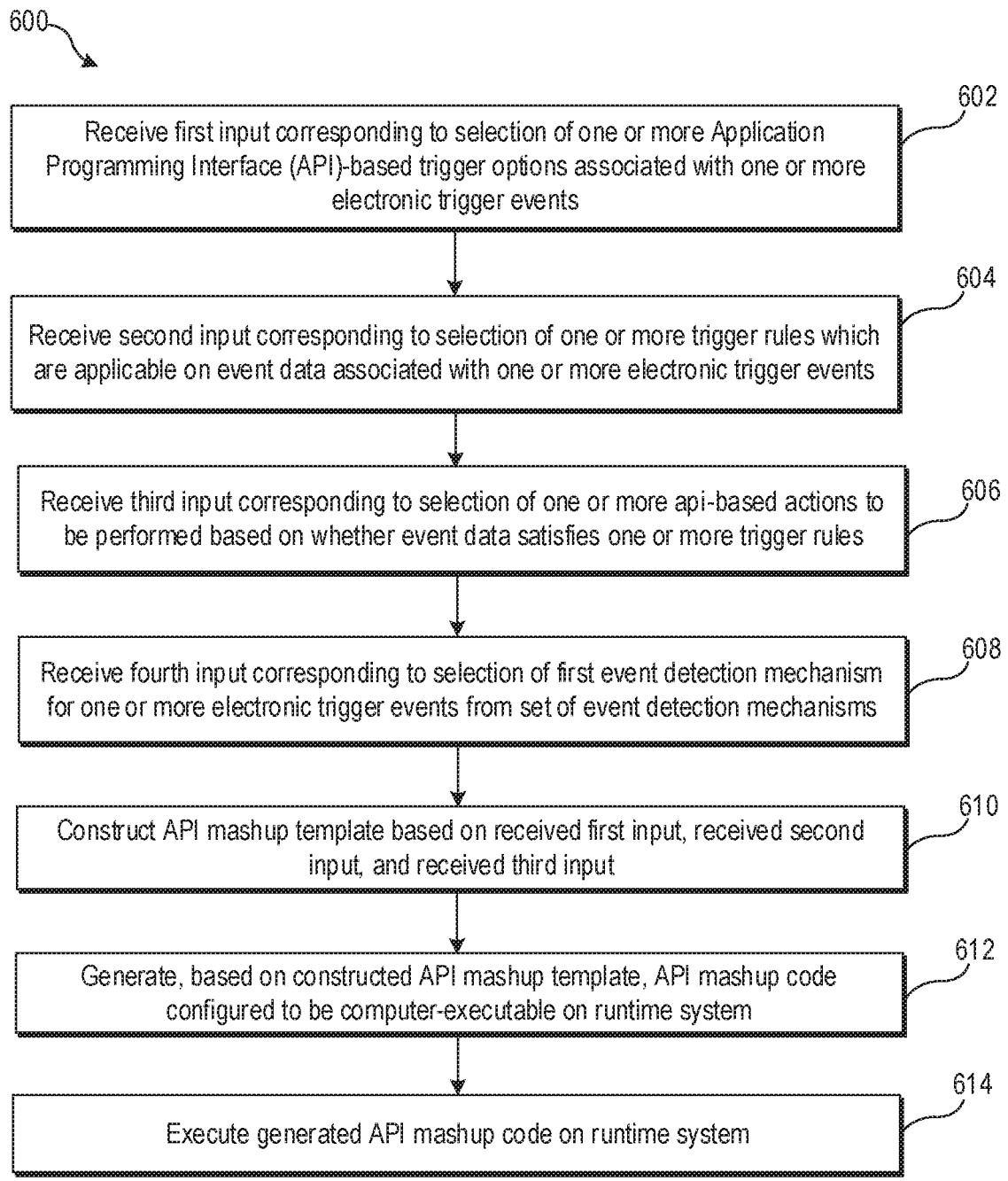
FIG. 6 illustrates a flowchart of an example method of automatic generation of code for an API mashup.

FIG. 6 illustrates a flowchart of an example method of automatic generation of code for an API mashup, according to at least one embodiment described in the present disclosure. FIG. 6 is explained in conjunction with elements from FIG. 1, FIG. 2, FIG. 3A, FIG. 3B, FIG. 4, and FIG. 5. With reference to FIG. 6, there is shown a flowchart 600. The method illustrated in the flowchart 600 may start at 602 and may be performed by any suitable system, apparatus, or device, such as by the system 102 of FIG. 1 or FIG. 2.

At 602, a first input may be received. The first input may correspond to a selection of one or more API-based trigger options. The one or more API-based trigger options may be associated with one or more electronic trigger events.

In one or more embodiments, each API-based trigger option may include an event source, a trigger option, and one or more trigger parameters for the trigger option. For selection of an API-based trigger option, the first input may include a selection of an event source (i.e. an API provider) via the event source menu 302A, a trigger option (i.e. an API endpoint) via the trigger options menu 302B, and one or more trigger parameters (i.e. endpoint parameters) via the trigger parameter menu 302C. For example, to select an API-based trigger option as "detect an electronic trigger event when a specific user with a specific user ID tweets on Twitter®", the user 112 may select Twitter® as the event source, "a specific user tweets" as the trigger option, and Twitter® User ID as the trigger parameter. The first input may be received from the user 112 via the electronic UI 300A or the electronic UI 300B displayed on the user device 104. Further details of the selection of one or more API-based trigger options are provided, for example, in FIG. 3A.

At 604, a second input may be received. The second input may correspond to selection of one or more trigger rules that may be applicable on event data associated with the one or more electronic trigger events. The event data may be received as a payload after an API call is made to an API endpoint (associated with the trigger option). Each trigger rule may include a rule operator and a rule pattern for the event data. For example, an electronic trigger event may be detected when a specific user with a specific user ID tweets on Twitter®". The user 112 may be allowed to configure a trigger rule as "trigger an API-based action when the tweet posted by the specific user with a user ID contains "trade" and "stocks" as two terms". In this example, the tweet may be event data and may be extracted from an API resource server for tweets, after the specific user with a specific user ID tweets on Twitter®. Also, "contains" may be the rule operator and "trade" and "stocks" may be two rule patterns. Further details of the selection of trigger rules are provided, for example, in FIG. 3A.

At 606, a third input may be received. The third input may correspond to a selection of one or more API-based actions. Each API-based action may be performed based on the whether the event data satisfies the one or more trigger rules (selected at 604). For example, for selection of an API-based action, the third input may include selection of an action destination (i.e. an API provider) via the action destination menu 306A, an action option (an API endpoint) via the action menu 306B, and action parameters (API endpoint parameters) via the action parameter menu 306C. Specifically, the third input may correspond to a selection of an API endpoint of an API provider and API endpoint parameters for the specified API endpoint. The API endpoint may have to be called using the API endpoint parameters to perform an API-based action. Further details of the selection of API-based actions are provided, for example, in FIG. 3A.

At 608, a fourth input may be received. The fourth input may correspond to a selection of a first event detection mechanism for the one or more electronic trigger events. The first event detection mechanism may be selected from among a set of event detection mechanisms, such as, a webhook-based event detection mechanism and a polling-based event detection mechanism. For example, in FIG. 3, the trigger detection mechanism menu 302D on the electronic UI 300A provides two options to the user 112 to select one of the polling-based event detection mechanism or the webhook-based event detection mechanism.

The first event detection mechanism may be utilized by the system 102 to detect the one or more electronic trigger events at the event source. For example, if an electronic trigger is defined as a new tweet posted by a user with a User ID #01, then an API endpoint may have to be called periodically using the polling-based event detection mechanism to detect new tweets by the user with the User ID #01 on the Twitter® API server (i.e. the event source). Alternatively, in case the webhook-based event detection mechanism is selected, a webhook be used to configure the Twitter® API server to deliver any new tweet from the user with the User ID #01 to the system 102. Further details of implementation of the event detection mechanisms are provided, for example, in FIG. 7.

At 610, an API mashup template may be constructed based on the received first input, the received second input, the received third input, and the received fourth input. In one or more embodiment, the API mashup template may be constructed as a conditional template based on an IFTTT approach (If This Then That), which may imply that an action may performed if a trigger satisfies a rule. The data in the API mashup template may be structured into suitable data format, such as JSON, YAML or XML, and may include, for example, a name or a unique mashup ID for the API mashup, a description of the API mashup, an enabled state of a trigger rule in the API mashup as one of true or false, one or more computer-executable codes associated with the one or more API-based trigger options (selected at 602), a first set of input parameters (trigger parameters) for the one or more computer-executable trigger codes, the one or more trigger rules which include a rule operator and a rule pattern for the event data, one or more computer-executable action codes associated with the one or more API-based actions, and a second set of input parameters (i.e. action parameters) for the one or more computer-executable action codes. In some embodiments, as output data (i.e. the event data) for an API-based trigger option (JSON format data) may be used to check a trigger rule or to perform an API-based action, the schema for the output data may be defined in the API mashup template. For example, trigger.key1 in the API mashup template may decoded as the output data (or the event data) with key "key1". In cases where trigger.key1 is in a string format, such as "trigger.key1", a special format may be defined, such as "{{trigger.key1}}" or "trigger.key1", to correctly extract the output data from the trigger (i.e. the event data).

In one or more embodiments, the API mashup template may be constructed to support various trigger-action scenarios, such as a single API-based trigger option causing a single API-based action, a single API-based trigger option causing multiple API-based actions, multiple API-based trigger options causing a single API-based action, and multiple API-based trigger options causing multiple API-based actions. Examples of the API mashup template for two of such trigger-action scenarios is provided in FIG. 4 and FIG. 5.

At 612, an API mashup code may be generated based on the constructed API mashup template. The API mashup code may include one or more computer-executable trigger codes associated with the one or more API-based trigger options (selected at 602), one or more computer-executable rule codes associated with the one or more trigger rules (selected at 604), and one or more computer-executable action codes (selected at 606) associated with the one or more API-based actions. In one or more embodiments, the generated API mashup code may also include a computer-executable code for the first event detection mechanism (selected at 608), which may be one of a webhook-based event detection mechanism or a polling-based event detection mechanism.

The generated API mashup code may be written in any suitable programming language, or a combination of programming languages, including, but not limited to, Java, Java 2ME, C/C++, Perl, Python. By way of example, and not limitation, a pseudocode of the generated API mashup code for the API mashup template 500 of FIG. 5 is provided as follows:

```
Run Executable_code_for_trigger_1(parameter_1,parameter_2) &
Executable_code_for_trigger_2(parameter_1,parameter_2)
If rule1(trigger1.key1) return True and rule2(trigger2.key2) return True:
    Run Executable_code_for_action_1(parameter_1,parameter_2) &
    Executable_code_for_action_2(parameter_1,parameter_2)
```

In one or more embodiments, the API mashup code may be generated further based on an API specification file, such as an Open API Specification (OAS) file. The API specification file may include necessary information to call an API endpoint. For example, the API specification file may include information, such as an API host address, API endpoints, HTTP method, and endpoint parameters for the API endpoints. The executable code is to send HTTP request by using the information in OAS file, as an example shown follows:

```
# Python code as example. Other language similar. Necessary
information to make this executable code, such as URL,
HTTP_METHOD, can be retrieved from OAS specification of the
API provider
    import requests
    URL= https://host address + endpoint
    HTTP_Method = 'POST'
    PARAMS = {"parameter1":"aaa","parameter2":"bbb"}
    api_call_response = requests(HTTP_METHOD, url=URL,
    params=PARAMS, auth=user_token)
```

In an embodiment, the system 102 may retrieve information including, but not limited to, an API host address, API endpoints, and endpoint parameters from the API specification file for an API associated with a first API-based trigger option of the one or more API-based trigger options. The system 102 may generate a computer-executable trigger code of the one or more computer-executable trigger codes based on the retrieved information and a trigger code template. For example, the trigger code template may be populated with the retrieved information to generate the computer-executable trigger code. The generated computer-executable trigger code may be included in the API mashup code.

In another embodiment, the system 102 may retrieve information including, but not limited to, an API host address, API endpoints, and endpoint parameters from the API specification file for an API associated with a first API-based action of the one or more API-based actions. The system 102 may generate a computer-executable action code of the one or more computer-executable action codes based on the retrieved information and an action code template. For example, the action code template may be populated with the retrieved information to generate the computer-executable action code. The generated computer-executable action code may be included in the API mashup code.

The API mashup code may also include one or more computer-executable rule codes, which may be associated with the one or more trigger rules. Each computer-executable rule code may include a sequence of code sections, such as a function declaration in which the value of the event data and the rule pattern may be provided as input, a corner case check, a check to determine whether the value and the rule pattern are formatted as a string, and a call to a built in operator (as the rule operator) to evaluate a result of a trigger rule. Typically, a corner case involves a problem or situation that occurs only outside of normal operating parameters, especially one that manifests itself when multiple environmental variables or conditions are simultaneously at extreme levels, even though each parameter is within the specified range for that parameter. By way of example, and not limitation, the rule code for 'equal' rule operator is provided in Table 3, as follows:

TABLE 3

Computer-executable rule code for "equal" rule operator

| | |
|---|---|
| def equal (value, rule_pattern): | Function Declaration (1) |
| if rule_pattern is None; | Corner Case Check (2) |
| return False | |

TABLE 3-continued

Computer-executable rule code for "equal" rule operator

| | |
|---|---|
| value, rule_pattern = ensure_operators_are_strings(value, rule_pattern) | Check whether value and rule pattern are in a string format (3) |
| return value ==rule_pattern; | Call to rule operator (4) |
| def ensure_operators_are_strings(value, rule_pattern): | Code for check function at (3) |
|   if isinstance(value, bytes): | |
|     value=value.decode('utf-8') | |
|   if isinstance(rule_pattern, bytes): | |
|     rule_pattern=rule_pattern.decode('utf-8') | |
|   return value, rule_pattern | |

At 614, the generated API mashup code may be executed on the runtime system 108. Herein, the runtime system 108 may refer to collection of managed hardware and software resources which are typically required for program execution. In one or more embodiments, in order to detect an electronic trigger event at the event source, the computer-executable code for the first event detection mechanism (selected at 608) may be executed.

By way of example, and not limitation, in cases where the first event detection mechanism is a polling-based event detection mechanism, the computer-executable code for the polling-based event detection mechanism may be executed on the runtime system 108. In the polling-based event detection mechanism, the runtime system 108 may periodically call a first API endpoint of an API provider (i.e. an event source) associated with the one or more electronic trigger events. Each call to the first API endpoint may include execution of a computer-executable trigger code (which includes API call code(s) for the first API endpoint). Based on the call, a set of call responses may be received from the API provider. The runtime system 108 may detect an electronic trigger event as a new electronic trigger event based on a comparison between a first call response in the received set of call responses and a second call response in the received set of call responses. The runtime system 108 may select the event data as the second call response based on the comparison. Herein, the second call response may be received after the first call response. In some cases, the second call response may be received just after the first call response.

In these or other embodiments, the runtime system 108 may determine a first differentiation key of a set of differentiable keys from the first call response and the second call response received after the first call response. The runtime system 108 may use a differentiation key to determine whether a call response corresponds to new event data or not. The first differentiation key may be a unique key in the JSON format of the first call response and the second call response, respectively. The unique key may be selected by the user 112 or an "id" key may be used by default as the first differentiation key. Details of the selection of a differentiation key are provided in FIG. 7, for example.

The runtime system 108 may detect the electronic trigger event of the one or more electronic trigger events as a new electronic trigger event based on a determination that a value of the determined first differentiation key in the first call response is different from a value of the determined first differentiation key in the second call response. The runtime system 108 may select the second call response as the event data after the detection of the new electronic trigger event.

The polling-based event detection mechanism may utilize more computing and memory resources due to frequent API calls, storage of numerous call responses, and comparison of call responses, and the like. The resource utilization of the polling-based event detection mechanism may depend on a polling interval, which may be configured by the system 102. In cases where the API provider charges for every call (e.g., USD per API call), it may not be cost-effective to use the polling-based event detection mechanism, especially for users who have a cost constraint. For above-mentioned reasons, certain users may not select the polling-based event detection mechanism. In such a case, users may select the webhook-based event detection mechanism, which may provide a built-in passive approach for receiving JSON or URL-encoded form data, via HTTP POST. This data must be "pushed" from an external system (i.e. an API resource server/event source) to the runtime system 108 when an electronic trigger event is detected.

At first, the webhook-based event detection mechanism may be configured on an API resource server (i.e. the event source) that may be associated with the one or more electronic trigger events. The webhook-based event detection mechanism may be configured based on configuration information which includes a payload uniform resource locator (URL) associated with the runtime system 108. The API resource server may execute a computer-executable code for the webhook-based event detection mechanism for detecting the one or more electronic trigger events and transmitting the event data associated with the detected one or more electronic trigger events to payload URL of the runtime system 108. The system 102 may receive the transmitted event data associated with the one or more electronic trigger events from the API resource server.

After the one or more electronic trigger events are detected, the one or more computer-executable trigger codes may be executed to receive the event data associated with the one or more electronic trigger events from the event source (i.e. the API resource server). Thereafter, the one or more computer-executable rule codes may be executed to generate a trigger response based on a determination that the received event data satisfies the one or more trigger rules. The generated trigger response may be true (1) if the received event data satisfies the one or more trigger rules or the generated trigger response may be false (0) if the received event data does not satisfy the one or more trigger rules. Thereafter, the one or more computer-executable action codes may be executed to perform the one or more API-based actions based on the generated trigger response. In an embodiment, the one or more API-based actions may be performed if the generated trigger response is true (1). With the execution of the computer-executable action codes, API call(s) may be made to respective API endpoint(s) of API provider(s) to perform one or more API-based actions. For example, if the tweet (event data) contains (i.e. rule operator) the term "stock" and "trade" (rule pattern), then an API-based action may include posting a notification on Slack®. In order to post the notification, a computer-executable action code may be executed to post an API call to the Slack® server for posting the notification. The user ID associated with the Slack® may be provided as an endpoint parameter (i.e. an action parameter) with the API call.

Control may pass to end. Although the flowchart 600 is illustrated as discrete operations, such as 602, 604, 606, 608, 610, 612, and 614. However, in certain embodiments, such discrete operations may be further divided into additional operations, combined into fewer operations, or eliminated, depending on the particular implementation without detracting from the essence of the disclosed embodiments.

Figure 7:
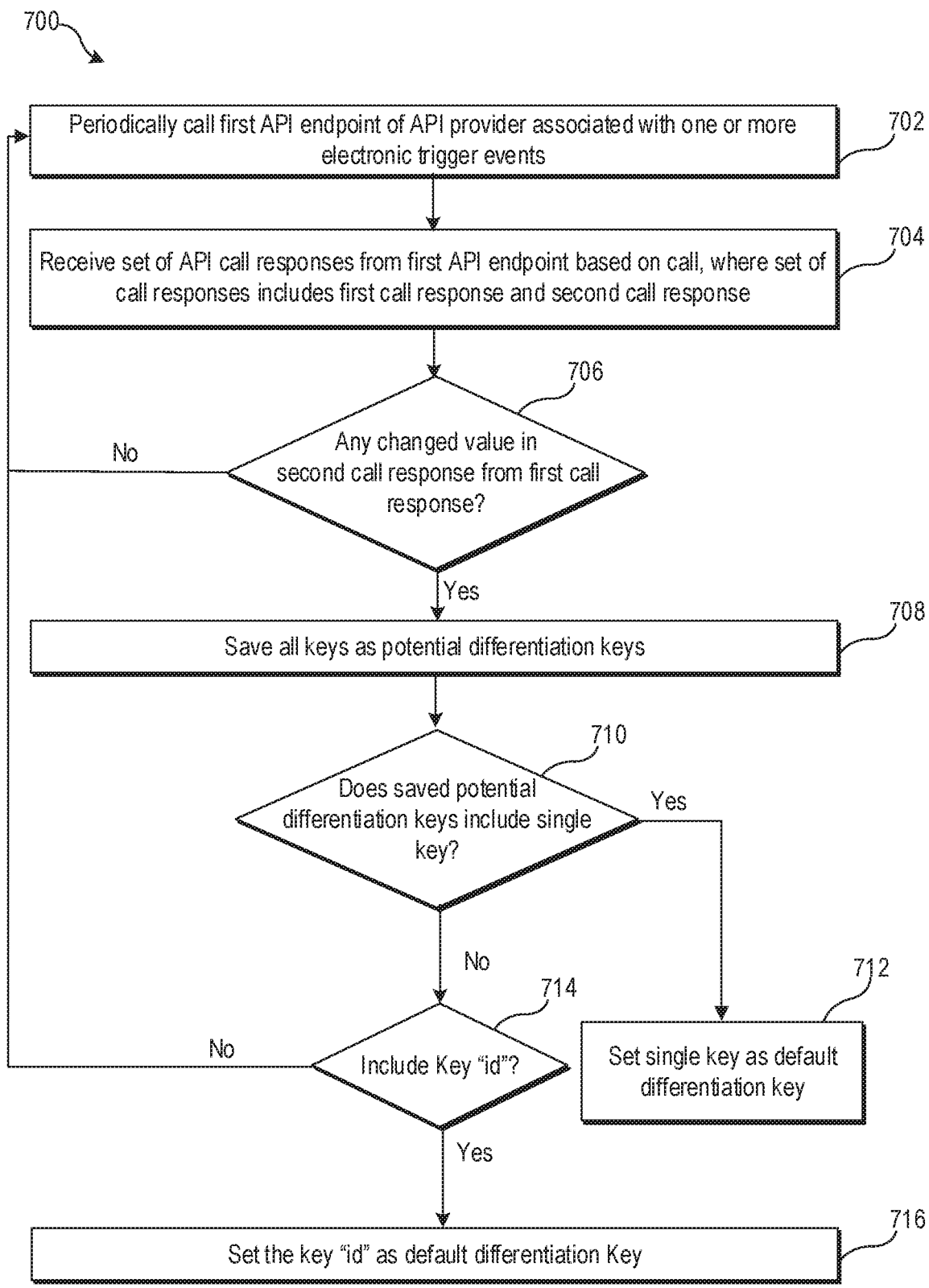
FIG. 7 illustrates a flowchart of an example method of selection of a differentiation key in polling-based event detection mechanism.

FIG. 7 illustrates a flowchart of an example method of selection of a differentiation key in polling-based event detection mechanism, according to at least one embodiment described in the present disclosure. FIG. 7 is explained in conjunction with elements from FIG. 1, FIG. 2, FIG. 3A, FIG. 3B, FIG. 4, FIG. 5 and FIG. 6. With reference to FIG. 7, there is shown a flowchart 700. The method illustrated in the flowchart 700 may start at 702 and may be performed by any suitable system, apparatus, or device, such as by the runtime system 108 of FIG. 1 or FIG. 2.

At 702, a first API endpoint of an API provider may be periodically called by the runtime system 108 with same inputs (i.e. same trigger parameters). The first API endpoint of the API provider may be associated with one or more electronic trigger events and may be periodically called by executing a computer-executable trigger code included in the generated API mashup code.

At 704, a set of API call responses may be received. The set of API call responses may be received from the first API endpoint based on the call and may include a first call response and a second call response. The second call response may subsequent to the first call response with no intermediate call response in between the first call response and the second call response. By way of example, and not limitation, the first call response and the second call response for Twitter® API is provided in Table 4, as follows:

At 706, the second call response may be compared with the first call response to determine if there is any change in key value(s). If the key value(s) of the first call response and the second call response is/are same, the control may pass to 702. Otherwise, the control may pass to 708.

At 708, a set of keys in the second call response having corresponding set of values different from that of the first call response may be saved in the memory 204 or in the persistent data storage 206. The set of keys may be saved as potential differentiation keys.

At 710, it may be determined whether the saved potential differentiation keys include a single key. In case the potential differentiation keys include a single key, control may pass to 712. Otherwise, control may pass to 712.

At 712, the single key may be set as a default differentiation key. At 714, it may be determined whether a key "id" is present in the set of keys. In case the key "id" is present, control may pass to 716. Otherwise, control may pass to 702. At 716, the key "id" may be set as the default differentiation key.

The differentiation key (or the default differentiation key) may serve as a unique key in a call response and may be utilized by the runtime system 108 to detect a new electronic trigger event. Thus, if the value of the differentiation key changes in the second call response, in comparison to the first call response, then the second call response may correspond to the new electronic trigger event and may be selected as the event data (to be used later to check trigger rules and/to perform API-based actions). For example, in Table 4, the value of the differentiation key "id" is same in the first call response and the second call response. Thus, the second call response may be ignored for the detection of a new electronic trigger event. Control may pass to end.

Although the flowchart 700 is illustrated as discrete operations, such as 702, 704, 706, 708, 710, 712, 714, and 716. However, in certain embodiments, such discrete operations may be further divided into additional operations, combined into fewer operations, or eliminated, depending

TABLE 4

| | API call responses |
|---|---|
| API Call Response (1) | {"id": "850006245121695744", "text": "1\/ Today we\u2019re sharing our vision for the future of the Twitter API platform!\nhttps:\/\/t.co\/XweGngmxlP", "user": { "id": 2244994945, "name": "Twitter Dev", "screen_name": "TwitterDev", "location": "Internet", "url": "https:\/\/dev.twitter.com\/", "description": "Your official source for Twitter Platform news, updates & events. Need technical help? Visit https:\/\/twittercommunity.com\/ \u2328\ufe0f #TapIntoTwitter" }, "place": { }, "entities": { "hashtags": [ ], "urls": [ { "url": "https:\/\/t.co\/XweGngmxlP", "unwound": { "url": "https:\/\/cards.twitter.com\/cards\/18ce53wgo4h\/3xo1c", "title": "Building the Future of the Twitter API Platform" } } ], "user_mentions": [ ] } } |
| API Call Response (2) | {"id": "850006245121695744", "text": "1\/ Today we\u2019re sharing our vision for the future of the Twitter API platform!\nhttps:\/\/t.co\/XweGngmxlP", "user": { "id": 2244994945, "name": "Twitter Dev", "screen_name": "TwitterDev", "location": "Internet", "url": "https:\/\/dev.twitter.com\/", "description": "Your official source for Twitter Platform news, updates & events. Need technical help? Visit https:\/\/twittercommunity.com\/ \u2328\ufe0f #TapIntoTwitter" }, "place": { }, "entities": { "hashtags": [ ], "urls": [ { "url": "https:\/\/t.co\/XweGngmxlP", "unwound": { "url": "https:\/\/cards.twitter.com\/cards\/18ce53wgo4h\/3xo1c", "title": "Building the Future of the Twitter API Platform"} } ], "user_mentions": [ ] } } | on the particular implementation without detracting from the essence of the disclosed embodiments.

Various embodiments of the disclosure may provide one or more non-transitory computer-readable storage media configured to store instructions that, in response to being executed, cause a system (such as the system 102) to perform operations. The operations may include receiving a first input corresponding to a selection of one or more Application Programming Interface (API)-based trigger options associated with one or more electronic trigger events. The operations may further include receiving a second input corresponding to a selection of one or more trigger rules which are applicable on event data associated with the one or more electronic trigger events. The operations may further include receiving a third input corresponding to a selection of one or more API-based actions to be performed based on whether the event data satisfies the one or more trigger rules. The operations may further include constructing an API mashup template (such as the API mashup template 400 or the API mashup template 500) based on the received first input, the received second input, and the received third input. The operations may further include generating, based on the constructed API mashup template, an API mashup code configured to be computer-executable on a runtime system (such as the runtime system 108).

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:

receiving a first input corresponding to a selection of one or more Application Programming Interface (API)-based trigger options associated with one or more electronic trigger events;

receiving a second input corresponding to a selection of one or more trigger rules which are applicable on event data associated with the one or more electronic trigger events;

receiving a third input corresponding to a selection of one or more API-based actions to be performed based on whether the event data satisfies the one or more trigger rules;

constructing, based on the received first input, the received second input, and the received third input, an API mashup template; and generating, based on the constructed API mashup template, an API mashup code configured to be computer-executable on a runtime system.

2. The method according to claim 1, wherein the constructed API mashup template comprises:

a unique mashup identifier, one or more computer-executable trigger codes associated with the one or more API-based trigger options, a first set of input parameters for the one or more computer-executable trigger codes, the one or more trigger rules comprising a rule operator and a rule pattern for the event data, one or more computer-executable action codes associated with the one or more API-based actions, and a second set of input parameters for the one or more computer-executable action codes.

3. The method according to claim 1, further comprising:

receiving a fourth input corresponding to a selection of a first event detection mechanism for the one or more electronic trigger events from among a set of event detection mechanisms;

constructing the API mashup template further based on the received fourth input; and generating, based on the constructed API mashup template, the API mashup code to include a first computer-executable code for execution of the first event detection mechanism on the runtime system.

4. The method according to claim 3, wherein the first event detection mechanism is one of a webhook-based event detection mechanism or a polling-based event detection mechanism.

5. The method according to claim 1, wherein the API mashup code comprises:

one or more computer-executable trigger codes associated with the one or more API-based trigger options, one or more computer-executable rule codes associated with the one or more trigger rules, and one or more computer-executable action codes associated with the one or more API-based actions.

6. The method according to claim 5, wherein the generating the API mashup code comprises:

retrieving, from an API specification file, information comprising an API host address, API endpoints, and endpoint parameters for an API associated with a first API-based trigger option of the one or more API-based trigger options; and generating a computer-executable trigger code of the one or more computer-executable trigger codes based on the retrieved information and a trigger code template.

7. The method according to claim 5, wherein the generating the API mashup code comprises:

retrieving, from an API specification file, information comprising an API host address, API endpoints, and endpoint parameters for an API associated with a first API-based action of the one or more API-based actions; and generating a computer-executable action code of the one or more computer-executable action codes based on the retrieved information and an action code template.

8. The method according to claim 5, further comprising executing the API mashup code on the runtime system, wherein the execution comprises:

executing the one or more computer-executable trigger codes to receive the event data associated with the one or more electronic trigger events from an event source;

executing the one or more computer-executable rule codes to generate a trigger response based on a determination that the received event data satisfies the one or more trigger rules; and executing the one or more computer-executable action codes based on the generated trigger response.

9. The method according to claim 1, further comprising:

configuring a webhook-based event detection mechanism on an API resource server that is associated with the one or more electronic trigger events based on configuration information comprising a payload Uniform Resource Locator (URL) associated with the runtime system, wherein the API resource server executes a computer-executable code for the webhook-based event detection mechanism for:

detecting the one or more electronic trigger events, and transmitting the event data associated with the detected one or more electronic trigger events to the runtime system; and receiving the event data associated with the one or more electronic trigger events from the API resource server.

10. The method according to claim 1, further comprising executing a computer-executable code for a polling-based event detection mechanism on the runtime system by:

periodically calling a first API endpoint of an API provider associated with the one or more electronic trigger events by periodically executing a computer-executable trigger code included in the generated API mashup code;

receiving a set of API call responses from the first API endpoint based on the call; and detecting an electronic trigger event of the one or more electronic trigger events based on a comparison between a first call response in the received set of call responses and a second call response in the received set of call responses.

11. The method according to claim 10, further comprising:

determining, from the first call response and the second call response received after the first call response, a first differentiation key of a set of differentiable keys;

detecting the electronic trigger event of the one or more electronic trigger events as a new electronic trigger event based on a determination that a value of the determined first differentiation key in the first call response is different from a value of the determined first differentiation key in the second call response; and selecting the second call response as the event data.

12. A non-transitory computer-readable storage medium configured to store instructions that, in response to being executed, causes a system to perform operations, the operations comprising:

receiving a first input corresponding to a selection of one or more Application Programming Interface (API)-based trigger options associated with one or more electronic trigger events;

receiving a second input corresponding to a selection of one or more trigger rules which are applicable on event data associated with the one or more electronic trigger events;

receiving a third input corresponding to a selection of one or more API-based actions to be performed based on whether the event data satisfies the one or more trigger rules;

constructing, based on the received first input, the received second input, and the received third input, an API mashup template; and generating, based on the constructed API mashup template, an API mashup code configured to be computer-executable on a runtime system.

13. The non-transitory computer-readable storage medium according to claim 12, wherein the constructed API mashup template comprises:

a unique mashup identifier, one or more computer-executable trigger codes associated with the one or more API-based trigger options, a first set of input parameters for the one or more computer-executable trigger codes, the one or more trigger rules comprising a rule operator and a rule pattern for the event data, one or more computer-executable action codes associated with the one or more API-based actions, and a second set of input parameters for the one or more computer-executable action codes.

14. The non-transitory computer-readable storage medium according to claim 12, wherein the operations further comprises:

receiving a fourth input corresponding to a selection of a first event detection mechanism for the one or more electronic trigger events from among a set of event detection mechanisms;

constructing the API mashup template further based on the received fourth input; and generating, based on the constructed API mashup template, the API mashup code to include a first computer-executable code for execution of the first event detection mechanism on the runtime system.

15. The non-transitory computer-readable storage medium according to claim 14, wherein the first event detection mechanism is one of a webhook-based event detection mechanism or a polling-based event detection mechanism.

16. The non-transitory computer-readable storage medium according to claim 12, wherein the API mashup code comprises:

one or more computer-executable trigger codes associated with the one or more API-based trigger options, one or more computer-executable rule codes associated with the one or more trigger rules, and one or more computer-executable action codes associated with the one or more API-based actions.

17. The non-transitory computer-readable storage medium according to claim 16, wherein the operations further comprises:

retrieving, from an API specification file, information comprising API endpoints and endpoint parameters for an API associated with a first API-based trigger option of the one or more API-based trigger options; and generating a computer-executable trigger code of the one or more computer-executable trigger codes based on the retrieved information and a trigger code template.

18. The non-transitory computer-readable storage medium according to claim 16, wherein the generating the API mashup code comprises:

retrieving, from an API specification file, information comprising API endpoints and endpoint parameters for an API associated with a first API-based action of the one or more API-based actions; and generating a computer-executable action code of the one or more computer-executable action codes based on the retrieved information and an action code template.

19. The non-transitory computer-readable storage medium, according to claim 16, wherein the operations further comprises executing the API mashup code on the runtime system, the execution comprising:

executing the one or more computer-executable trigger codes to receive the event data associated with the one or more electronic trigger events from an event source;

executing the one or more computer-executable rule codes to generate a trigger response based on a determination that the received event data satisfies the one or more trigger rules; and executing the one or more computer-executable action codes based on the generated trigger response.

20. A system, comprising:

a processor communicatively coupled to a runtime system, wherein the processor is configured to:

receive a first input corresponding to a selection of one or more Application Programming Interface (API)-based trigger options associated with one or more electronic trigger events;

receive a second input corresponding to a selection of one or more trigger rules which are applicable on event data associated with the one or more electronic trigger events;

receive a third input corresponding to a selection of one or more API-based actions to be performed based on whether the event data satisfies the one or more trigger rules;

construct, based on the received first input, the received second input, and the received third input, an API mashup template;

generate, based on the constructed API mashup template, an API mashup code configured to be computer-executable on the runtime system and configure a webhook-based event detection mechanism on an API resource server that is associated with the one or more electronic timer events based on configuration information comprising a payload Uniform Resource Locator (URL) associated with the runtime system.

\* \* \* \* \*